United States Patent [19]
Kaura et al.

[11] Patent Number: 5,736,825
[45] Date of Patent: Apr. 7, 1998

[54] METHOD AND APPARATUS FOR LINEARIZING PULSE WIDTH MODULATION BY MODIFYING COMMAND VOLTGES

[75] Inventors: Vikram Kaura, Cedarburg; Luis J. Garces, Mequon, both of Wis.

[73] Assignee: Allen-Bradley Company, Inc., Milwaukee, Wis.

[21] Appl. No.: 670,059

[22] Filed: Jun. 25, 1996

[51] Int. Cl.⁶ .................................................. G05B 11/28
[52] U.S. Cl. .................... 318/599; 318/798.815; 363/41
[58] Field of Search ............................ 318/798.815, 599; 363/41, 98

[56] References Cited

U.S. PATENT DOCUMENTS 5,610,806  3/1997  Blasko et al. ..................... 363/41

*Primary Examiner*—Karen Masih
*Attorney, Agent, or Firm*—Michael A. Jaskolski; John M. Miller; John J. Horn

[57] ABSTRACT

A method and/or apparatus for altering command voltages when a modulation index is greater than unity in order to maintain the linear relationship between the fundamental component of phase voltage and a sinusoidal command voltage in PWM inverter or converter usage. The method and/or apparatus calculates a command signal magnitude above which a command signal should be clamped to a peak carrier value in order to add volt-sec to an output phase voltage that are lost when the amplitude of the command signal exceeds that of a carrier signal. A modified command signal is provided which maintains said linear relationship.

17 Claims, 6 Drawing Sheets

METHOD AND APPARATUS FOR LINEARIZING PULSE WIDTH MODULATION BY MODIFYING COMMAND VOLTGES

FIELD OF THE INVENTION

The field of the invention is electrical power conversion equipment and, more particularly, PWM control methods used with DC to AC inverters and AC to DC converters.

DESCRIPTION OF THE ART

Many AC motor applications require that a motor be driven at various speeds. Motor speech can be adjusted with an adjustable speed drive (ASD) which is placed between a DC voltage source and an associated motor that can excite the motor at various AC frequencies. One commonly used type of ASD uses a pulse width modulated (PWM) inverter and associated PWM controller which can control both voltage and frequency of signals that eventually reach motor stator windings.

Typical motors have three phases which are separately controlled via an inverter and a controller. Referring to FIGS. 1(a)–1(c), although only a single command voltage $V_c$ and signals generated therefrom are illustrated, a three phase PWM inverter for controlling a three phase motor is driven by three such sinusoidal reference voltages, a separate reference voltage corresponding to each of the three motor phases (i.e., each of three motor stator windings). In the interest of providing a simple explanation of a PWM inverter only one sinusoidal command voltage $V_c$ and signals generated therefrom are explained here in detail.

Referring specifically to FIGS. 1(a) and 1(b), a PWM controller receives three sinusoidal command signals $V_c$ and a carrier signal $V_T$, compares each sinusoidal command signal $V_c$ to the carrier signal $V_T$ and generates a firing signal $V_f$ corresponding to each sinusoidal command signal. When a sinusoidal command signal $V_c$ is greater than the carrier signal $V_T$, a corresponding firing signal $V_f$ is high. When a sinusoidal command signal $V_c$ is less than the carrier signal $V_T$, a corresponding firing signal $V_f$ is low. For the purposes of this explanation, it will be assumed that the carrier signal has a maximum magnitude or peak carrier value $\hat{V}_T$ of one (i.e. maximum amplitude is ±1.0).

The firing signals $V_f$ are used to control an associated PWM inverter. A PWM inverter consists of a plurality of switches that alternately connect associated motor stator windings to positive or negative DC voltage buses to produce a series of high frequency voltage pulses that excite the stator windings.

Referring to FIG. 1(c), an exemplary sequence of high frequency pulses $V_h$ that an inverter might generate across a stator winding can be observed along with an exemplary low frequency alternating phase voltage $V_{phf}$. The phase voltage $V_{phf}$ is the fundamental component of the high frequency pulse sequence $V_h$. The high frequency pulses $V_h$ are positive when the firing signal $V_f$ is high and negative when the firing signal $V_f$ is low. The maximum magnitude of each pulse $V_h$ is half the DC potential between the positive and negative DC bus lines. Thus, where the DC potential is $V_{dc}$, the maximum magnitude is $+V_{dc}/2$ and the minimum magnitude is $-V_{dc}/2$.

By firing the PWM switches according to the firing signals $V_f$, the widths of the positive portions 10 of each high frequency pulse relative to the widths of the negative portions 12 over a series of high frequency pulses $V_h$ varies. The varying widths over the period of the command signal $V_c$ generate the low frequency fundamental component alternating phase voltage $V_{phf}$.

The low frequency phase voltage $V_{phf}$ in turn produces a low frequency alternating phase current $I_{ph}$ that lags the voltage by a phase angle $\phi$. The phase current $I_{ph}$ drives the motor which operates at the frequency of the phase current $I_{ph}$.

By changing the frequency of the sinusoidal command signal $V_c$, the frequency of the phase current $I_{ph}$, and thus the motor speed, can be altered. For example, by increasing the frequency of the sinusoidal command signal $V_c$, the frequency of the phase current $I_{ph}$ can be increased and motor speed can in turn be increased. Motor speed can be decreased by decreasing the sinusoidal command signal $V_c$ frequency.

In addition, by changing the peak to-peak of the sinusoidal command signal $V_c$ while maintaining a constant frequency, the amplitude of the fundamental component phase voltage $V_{phf}$ can be altered. For example, referring to FIG. 2(a), a carrier signal $V_T$ and a plurality of in-phase sinusoidal command signals $V_{c0}$–$V_{c4}$ which are characterized by different peak values are illustrated. FIG. 2(b) illustrates the effective command voltages $V_{c0e}$ through $V_{c4e}$ corresponding to the command voltages $V_{c0}$ through $V_{c4}$ in FIG. 2(a). The effective command voltages $V_{c0e}$–$V_{c4e}$ are the parts of the command voltages $V_{c0}$–$V_{c4}$ which are below the carrier peak value $\hat{V}_T$. When a zero sinusoidal command signal $V_{c0}$ is provided, the effective command voltage $V_{c0e}$ is zero. On the other hand, where a high sinusoidal command signal $V_{c4}$ is provided (i.e. where the peak sinusoidal command signal is much greater than the peak carrier signal), the effective command voltage $V_{c4e}$ approximates a square wave having a fundamental component $4/\pi$ times the maximum DC voltage value.

Referring to FIG. 2(c), in the present case, where the maximum DC voltage value is $V_{dc}/2$, the maximum fundamental phase voltage $V_{phM}$ approaches $$\frac{2V_{dc}}{\pi} \left( \text{i.e.} \frac{V_{dc}}{2} \cdot \frac{4}{\pi} \right).$$

Thus, the range of possible fundamental phase voltages is between 0 and $$\frac{2V_{dc}}{\pi}.$$

Ideally a linear relationship should exist between the sinusoidal command signals $V_c$ and the fundamental component phase voltage $V_{phf}$ such that any change in the sinusoidal command signal $V_c$ magnitude is mirrored by a linear change in the fundamental component phase voltage $V_{phf}$ magnitude assuming that the maximum phase voltage is not surpassed. Unfortunately, typical PWM controllers can only provide a linear relationship between the control voltage $V_c$ and the fundamental component phase voltage $V_{phf}$ over a reduced range of possible phase voltage.

When a PWM inverter is used to provide a phase voltage outside the reduced linear range, the phase voltage gain is sharply reduced which in turn restricts the range of accurate speed and torque regulation. In other applications such as for utility interfacing as a voltage source converter, reduced gain restricts the range of fluctuations in the utility voltage which can be handled effectively to keep the desired bus voltage and power factor with low harmonic distortion.

Referring again to FIG. 1(a), an amplitude modulation index $M_i$ is defined as the ratio of the peak sinusoidal command signal value $\hat{V}_c$ and the peak carrier signal value $\hat{V}_T$. By increasing the modulation index $M_i$, the amplitude of the fundamental component phase voltage $V_{phf}$ can be increased.

PWM inverter operation can be divided into three modulation index magnitude dependent modes. Referring again to FIGS. 2(a), a first mode of operation is referred to as the linear mode of PWM operation which occurs when the modulation index $M_i$ is less than one. In FIG. 2(a), all three sinusoidal command signals $V_{c0}$, $V_{c1}$, and $C_{c2}$ drive an inverter in this linear mode of operation. Referring also to FIG. 2(c), in the linear mode, any increase in the command voltage magnitude is followed by a linear increase in the fundamental component voltage $V_{phf}$.

Referring also to FIGS. 1(a)–1(c), as the command voltage $V_c$ magnitude is increased in the linear mode, the ratio of time during which the command voltage $V_c$ waveform is above the carrier voltage $V_T$ to the time during which it is below the carrier voltage $V_T$ increases linearly which is reflected in the firing signal $\bar{V}_f$, the high frequency voltage pulse $V_h$, and eventually in the magnitude of the phase voltage $V_{phf}$.

Referring again to FIGS. 2(a) and 2(c), the linear relationship between command voltages $V_{c0}$, $V_{c1}$, $V_{c2}$ and related phase voltages $V_{ph0}$, $V_{ph1}$, $V_{ph2}$ can be observed. Referring also to FIG. 3, the phase voltage gain $G_v$ as a function of the modulation index $M_i$ is illustrated. The phase voltage gain $G_v$ is the ratio of the peak fundamental component phase voltage $\hat{V}_{phf}$ to peak command voltage $\hat{V}_c$ times one-half the DC bus value (i.e.

$$G_v = \frac{\hat{V}_{phf}}{\hat{V}_c} \cdot \frac{V_{dc}}{2}).$$

Up to a modulation index $M_i$ of 1.0 the phase voltage gain $G_v$ is constant.

A second mode is the non-linear or pulse dropping mode of operation which occurs when the modulation index $M_i$ exceeds one. In FIG. 2(a), sinusoidal command signals $V_{c3}$ and $V_{c4}$ drive an inverter in this non-linear mode. Here a specific increase in the peak command voltage $\hat{V}_c$ does not linearly increase the peak fundamental component phase voltage $\hat{V}_{phf}$. For example, referring to FIGS. 2(a) and 2(c), where an initial command voltage is $V_{c2}$ and the modulation index is 1.0, a 30% increase in the command voltage to $V_{c3}$ where the modulation index is 1.3 may only result in, for example, a 13% increase in the resulting phase voltage $V_{ph3}$ (i.e. $V_{ph3} = 1.13 V_{ph2}$).

Referring still to FIG. 2(a), where the modulation index $M_i$ exceeds one, only the portion of the command voltage $V_{c3}$ which is below the peak value of the carrier voltage $V_T$ is effective for modulation purposes. Referring also to FIG. 3, the phase voltage gain $G_v$ reduces sharply in a non-linear fashion, hence the reference "non-linear mode".

The third mode is often referred to as the six step mode which occurs when the peak value of the command voltage $\hat{V}_c$ is much greater than the peak value of the carrier voltage (i.e. $\hat{V}_c \approx 5\hat{V}_T$). In FIG. 2(a), command voltage $V_{c4}$ corresponds to a modulation index $M_i$ of 5.0 and therefore approaches the six step mode of operation. Here, the effective command voltage $V_{c4e}$ approaches a square wave and the phase voltage gain $G_v$ approaches zero. In this mode, the AC phase voltage $V_{ph4}$ starts to saturate and reach its theoretical maximum of $$\frac{2V_{dc}}{\pi}.$$

One method which can be used to extend the linear region of PWM operation is to have DC bus voltage maintained at a higher than needed value so that PWM operation always remains within a desired linear region. Besides the added cost of some form of control to maintain a higher bus voltage, this solution results in a cost and size penalty for the DC bus capacitor banks along with increased switching losses.

U.S. Pat. No. 5,329,217 entitled Compensated Feedforward Voltage for a PWM AC Motor Drive which issued to Kerkman, et al. on Jul. 12, 1994, describes another method which can be used to extend the linear region of PWM operation to include the entire range of fundamental phase voltages (i.e. zero to $$\frac{2V_{dc}}{\pi}).$$

In this method, in the non-linear mode of operation, the command voltage $V_c$ is multiplied by a gain factor which increases as an inverse function of the PWM gain in other words, when the phase voltage gain drops in the non-linear region, the magnitude of the sinusoidal command signal $V_c$ is increased to maintain the desired output voltage. The drawback of this method is that the sinusoidal command signal $V_c$, after being adjusted for the falling gain, results in an extremely high modified command voltage value.

To approach within 0.5% of the sinusoidal command signal $V_c$ required to provide the maximum phase voltage $V_{phf}$, the modulation index $M_i$ typically needs to be pushed to a value of 5.0 or beyond. This means that a PWM controller must be able to handle peak command voltages $\hat{V}_c$ at least as large as five times the peak carrier signal $\hat{V}_T$.

This method runs into implementation problems in both the analog and digital domains. In the analog domain this method is difficult to implement because amplifiers and the like tend to saturate where the command voltage $V_c$ is excessive. In the digital domain, increased command voltage $V_c$ levels require additional memory for storing large digital words needed to identify and differentiate large sinusoidal command signals. These analog and digital problems result in a reduction in the dynamic range of associated control as the PWM controller must handle a wide range of control voltages.

U.S. Pat. No. 5,153,821, entitled Pulse Width Modulation Method For Providing Extended Linearity, Reduced Communication Losses And Increase In Inverter/Converter Output Voltage, which issued to Blasko on Oct. 6, 1992, describes another method for extending the linear range of PWM operation. This method provides a modified non-sinusoidal command signal to the PWM inverter. This method extends the linear range of inverter operation to the point where the modulation index $M_i$ is equal to 1.1547. However, after the modulation index $M_i$ exceeds 1.1547, this method faces the same problems with linear operation as described above.

U.S. patent application Ser. No. 08/555.664 entitled Method and Apparatus for Linearizing Pulse Width Modulation in Overmodulation Region which was filed on Nov. 13, 1995, describes yet another method to extend the linear PWM operating range. This method adds a modifier signal to the command signal to provide a modified command signal that, when compared to the carrier signal, produces a fundamental component phase voltage that maintains the linear relationship with the command signal thus extending the linear operating range to all possible phase voltage values. Using this method, if the modifier and command signals are not in-phase, instead of providing a desired modified command signal, the method provides an erroneous modified signal. The erroneous signal propagates through the control system and eventually provides a distorted phase voltage that is not linearly related to the command signal. In fact, in some cases, where the modifier and command signals are sufficiently out of phase, the modified command signal will further reduce linearity between the command signal and the resulting phase voltage. Thus, to ensure linearity, this method requires both a mechanism to track signal phase and a mechanism to ensure that the modifier and command signals are in-phase when added. These requirements undesirably increase control costs.

Therefore, it would be advantageous to have a method for controlling a PWM controller which could extend the linear range of PWM operation to all possible phase voltage values without requiring special hardware or additional memory and without reducing the dynamic range of control by using excessive sinusoidal command signals $V_c$.

SUMMARY OF THE INVENTION

The present invention is a new method to maintain the fundamental component gain of a PWM inverter after a modulation index $M_i$ exceeds unity (or, in other modulation schemes known to the art, where $M_i$ exceeds $2/\sqrt{3}$) and the PWM inverter enters the typically non-linear pulse dropping region of operation. The method alters the command signal $V_c$ in the non-linear region of operation as a function of the modulation index $M_i$ by clamping the command signal $V_c$ to either a peak positive or negative carrier value for a portion of each half-cycle of the original command signal. The command signal clamping compensates for volt-secs lost in the original command signal $V_c$ (because it exceeded the peak carrier values) by providing additional volt-secs below the peak carrier value boundary in a modified command signal $V_{mc}$. The clamping linearizes PWM operation all the way to the six-step mode of operation. The modulation index required by this method does not exceed $4/\pi$ and therefore, the dynamic range of associated control is increased.

One object of the present invention is to provide a method whereby a linear relationship can be maintained between the a sinusoidal command signal and fundamental component of output phase voltage. By clamping the command signal to the peak positive or negative carrier values for a portion of each command signal half-cycle, where the portion is calculated to increase in magnitude as an inverse function of the PWM gain drop-off, linear operation of the PWM inverter (or converter) can be extended so that it covers a range of fundamental phase voltages from zero to $4/\pi$ times the maximum value of the DC voltage. Hereinafter the peak positive and negative carrier values will be assumed to be plus unity or minus unity and referred to as +1 or −1 for simplicity.

Another object of the present invention is to extend the range of linear PWM operation without requiring additional hardware or memory and without reducing the dynamic range of associated control. Because the modulation index $M_i$ does not exceed $4/\pi$, the command voltage remains in a relatively low range which is not likely to saturate an analog amplifier and which does not require additional bits in memory to identify voltage magnitude.

In addition, the present method and associated apparatus do not require phase sensing hardware or hardware for ensuring that a modifier signal and the command signal are in-phase. According to the present method, a clamp magnitude h is calculated as a function of the current modulation index $M_i$. Each time the command signal $V_c$ reaches magnitude h, the controller clamps the command signal to either +1 or −1, depending on command signal polarity, to provide a modified command signal $V_{mc}$. Command signal magnitude is already monitored and therefore no additional hardware is required to implement the present method.

Other and further objects and aspects of the present invention will become apparent during the course of the following description and by reference to the accompanying drawings.

DESCRIPTION OF THE PREFERRED EMBODIMENT

In the following description, all "c" subscripts will refer to sinusoidal command signals, all "f" subscripts will refer to fundamental components of associated signals or voltages, all "^" symbols will identify peak values of corresponding wave forms and all "ph" subscripts will refer to phase signals, unless the description indicates otherwise.

Figure 1A:
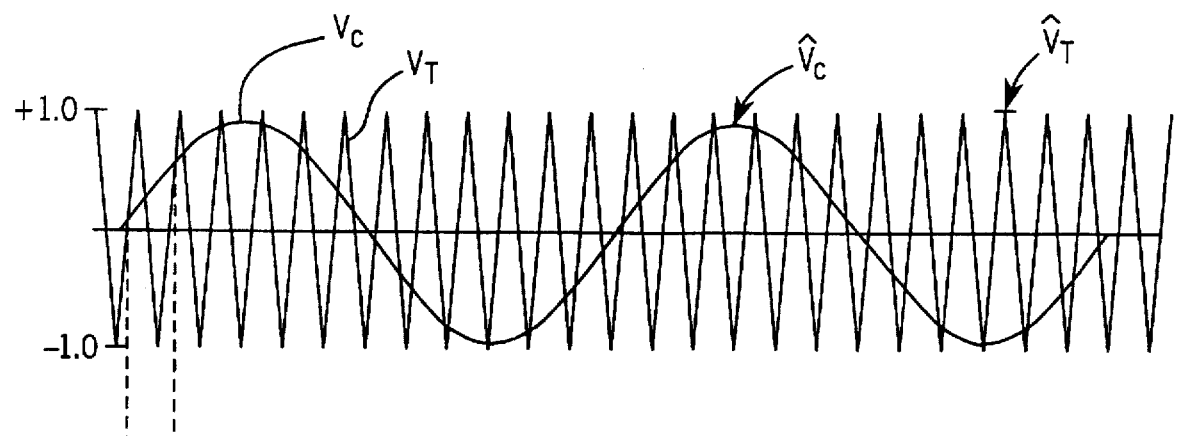
FIG. 1(a) is a graph illustrating carrier and command voltages.
Figure 4A:
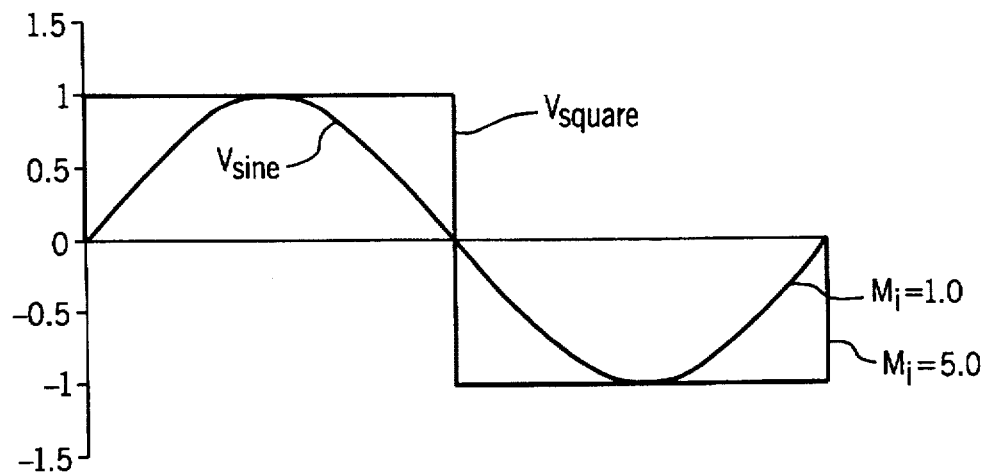
FIG. 4(a) is a graph illustrating the shapes of effective command voltages at the boundaries of the nonlinear region of operation.

Referring to FIGS. 1(a) and 4(a), assuming a peak carrier voltage $V_T$ of one, when increasing the command voltage $V_c$ past the point where the modulation index $M_i$ is equal to one, the effective command voltage goes from being a sine wave $V_{sine}$ of unit magnitude at $M_i=1$ to an approximate square wave $V_{square}$ of unit magnitude for $M_i > 5.0$. Thus, in order to maintain a linear relationship between the command voltage $V_c$ and a resulting fundamental component of phase voltage where the modulation index $M_i$ is greater than unity, a method must be provided to control the progression of the effective command voltage to maintain the linear relationship.

Figure 4B:
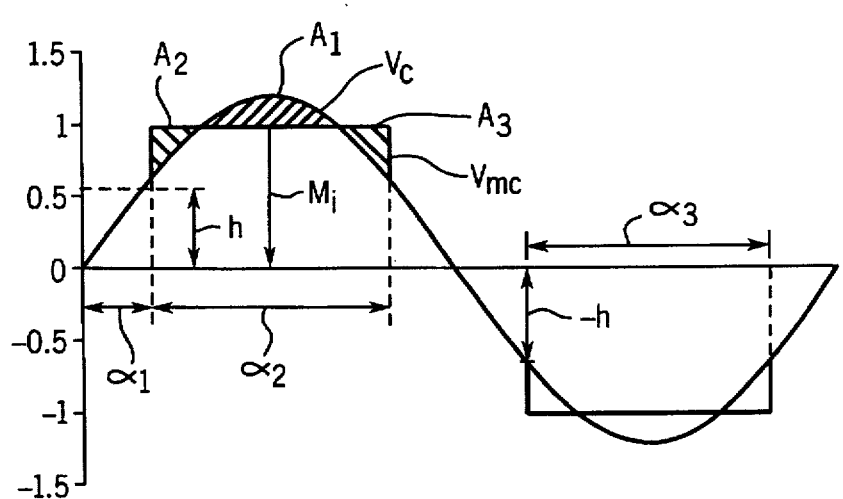
FIG. 4(b) is a graph showing a command voltage where $M_i > 1.0$ and a modified command signal according to the present invention.

Referring also to FIG. 4(b), when the command voltage $V_c$ exceeds unity, a pulse dropping area $A_1$, between the command voltage $V_c$ and unity has no effect on as associated ultimate phase voltage. In other words, $A_1$ volt-secs are lost when $M_i$ is greater than unity.

It has been recognized that the command voltage $V_c$ can be altered to provide a modified command voltage $V_{mc}$ to compensate for lost volt-secs when $M_i$ is greater than unity. Referring still to FIG. 4(b), during a portion of each command signal half-cycle when the command signal $V_c$ exceeds a clamp magnitude h, the command signal $V_c$ can be clamped to unity (or negative unity during a negative half-cycle) to provide a modified command signal $V_{mc}$ that has a greater number of volt-secs below unity than the original command signal $V_c$. By choosing the correct magnitude h, the additional volt-secs (represented in FIG. 4(b) by areas $A_2$ and $A_3$) can be made to equal lost volt-secs $A_1$. Importantly, the clamp magnitude h is solely a function of the modulation index $M_i$.

After the modified command signal $V_{mc}$ is generated, it can be compared to the carrier voltage $V_T$ to provide firing signals to a PWM inverter. The firing signals reflect the modified command signal $V_{mc}$ and provide a phase voltage having a fundamental component that is equal to the fundamental component of the original command signal $V_c$ where magnitude h has been chosen appropriately.

As the modulation index $M_i$ increases further above unity, the pulse dropping area $A_1$ increases. To compensate for increased area $A_1$, areas $A_2$ and $A_3$ must also be increased. This is accomplished by reducing the clamp magnitude h. For example, at one extreme where the modulation index $M_i$ is unity, magnitude h is unity. At the other extreme, where the modulation index $M_i$ is $4/\pi$, magnitude h is zero. Eventually the command signal sine wave is completely eliminated providing a substantially square wave of unit magnitude when magnitude h is zero.

Analytical Development

The fundamental component $V_{mcf}$ of the modified command signal is linearly related to the fundamental component of the phase voltage $V_{phf}$. Thus, by maintaining a linear relationship between the fundamental component $V_{mcf}$ of the modified command signal and the magnitude of the command voltage $V_c$, the linear relationship between the command voltage $V_c$ and the fundamental phase voltage $V_{phf}$ can be extended.

The required condition for extended linearity is therefore:

$$V_{mcf} = V_{cf} \qquad \text{Eq. 1}$$

Referring to FIG. 4(b), this requirement translates into picking the correct magnitude of h for a given modulation index $M_i$. In other words, for every quarter cycle the original command signal $V_c$ must be kept unchanged for an angle $\alpha_1$ must be forced to be +1 or −1 for the remaining period $\pi/2 - \alpha_1$. Therefore, in terms of magnitude h:

$$V_{mc} = \begin{cases} V_c, & -h \leq V_c \leq +h \\ \text{sign}(V_c)(1), & \text{otherwise} \end{cases} \qquad \text{Eq. 2}$$

Using fourier analysis, the fundamental component $V_{mcf}$ of the modified command signal can be derived as a function of magnitude h and modulation index $M_i$ such that:

$$V_{mcf} = \frac{4}{\pi} \cos\left[\sin^{-1}\left(\frac{h}{M_i}\right)\right] + \qquad \text{Eq. 3}$$

-continued
$$\frac{M_i}{\pi}\left[(2)\sin^{-1}\left(\frac{h}{M_i}\right) - \sin\left[(2)\sin^{-1}\left(\frac{h}{M_i}\right)\right]\right]$$

Combining Equation 1 and 3:

$$\frac{4}{\pi} \cos\left[\sin^{-1}\left(\frac{h}{M_i}\right)\right] + \qquad \text{Eq. 4}$$
$$\frac{M_i}{\pi}\left[(2)\sin^{-1}\left(\frac{h}{M_i}\right) - \sin\left[(2)\sin^{-1}\left(\frac{h}{M_i}\right)\right]\right] = V_{cf} = M_i$$

Solving Equation 4 magnitude h can be determined (for various modulation indices $M_i$) which, when used to generate the modified command signal $V_{mc}$ according to Equation 2, result in a linear relationship between the fundamental component of the command signal $V_{cf}$ and the fundamental component of phase voltage $V_{phf}$ for a full range of operation.

Figure 8:
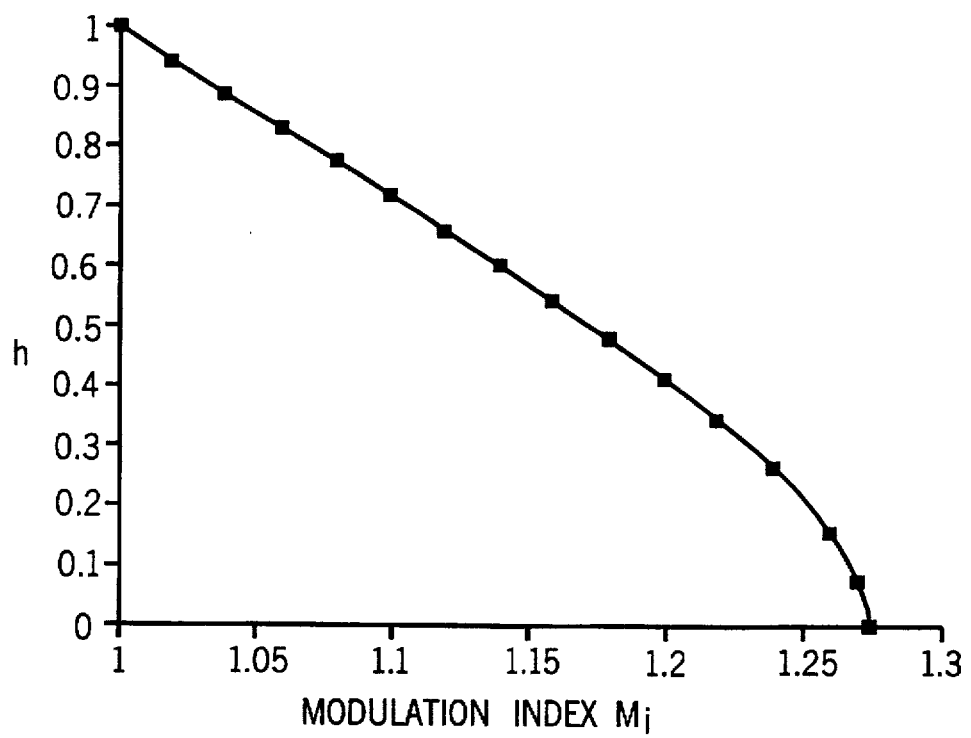
FIG. 8 is a graph illustrating the magnitude h as a function of the modulation index $M_i$.

The solution of Equation 4 is plotted in FIG. 8 for various values of the modulation index $M_i$. When the modulation index $M_i$ is unity, magnitude h is unity. As a result, when the modulation index $M_i$ is unity, both the command signal $V_c$ and the modified command signal $V_{mc}$ are identical. At the other extreme, with the modulation index $M_i = 4/\pi$, magnitude h is zero and the modified command signal $V_{mc}$ is a square wave as desired.

Hardware Implementation

Figure 5:
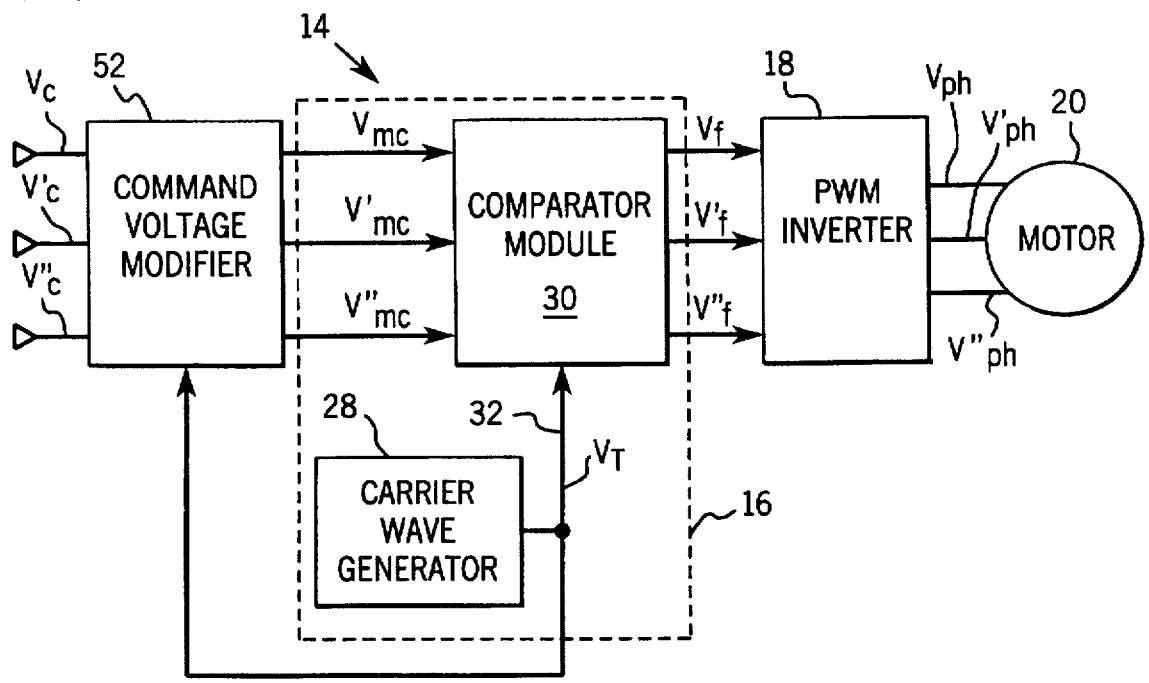
FIG. 5 is a schematic diagram of a motor control system according to the present invention.

Referring now to FIG. 5, the present invention will be described in the context of an exemplary three phase motor control system 14 including a PWM controller 16 and a PWM inverter 18.

Figure 1B:
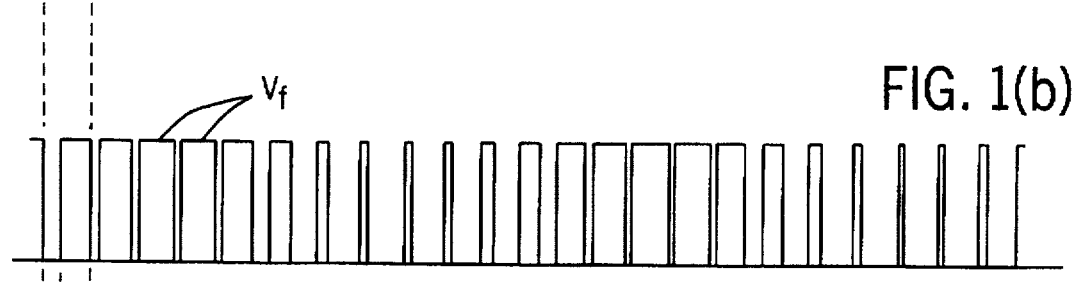
FIG. 1(b) is a graph illustrating resultant firing signals.
Figure 1C:
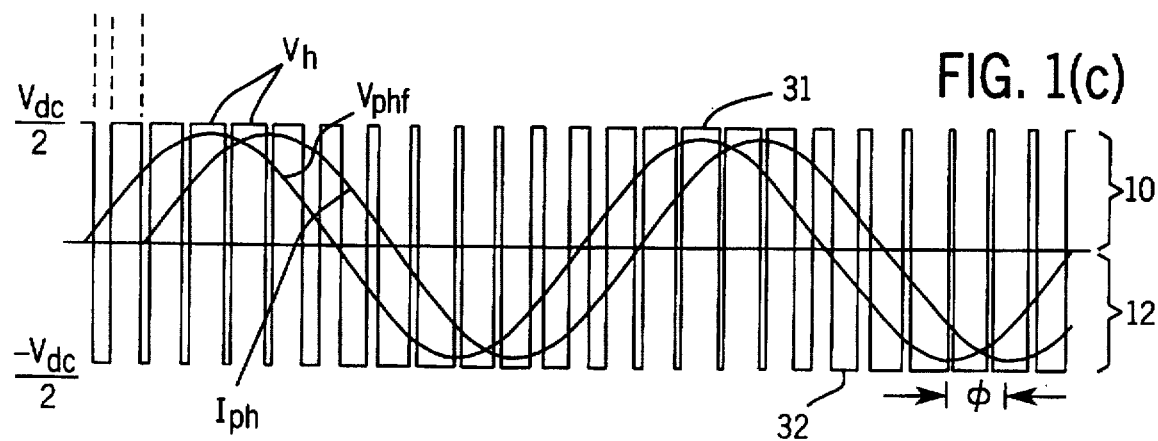
FIG. 1(c) is a graph illustrating the high frequency pulses generated by a PWM inverter, a resulting low frequency phase voltage, and an associated fundamental component phase current.
Figure 2A:
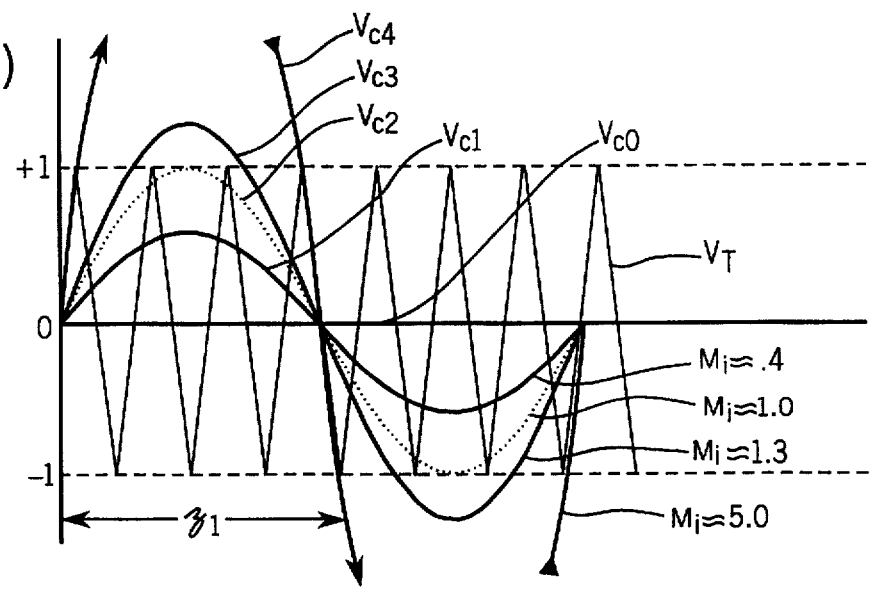
FIG. 2(a) graph illustrating various command voltages.
Figure 2B:
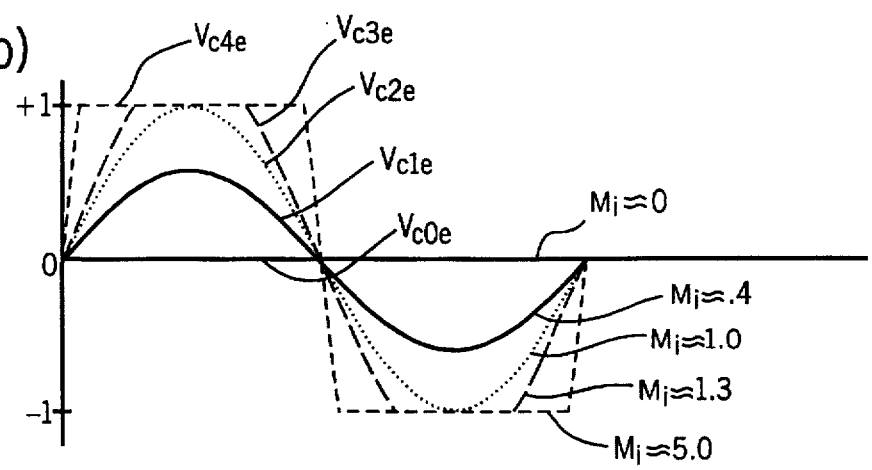
FIG. 2(b) is a graph illustrating effective command voltages corresponding to the command voltages of FIG. 2(a)
Figure 2C:
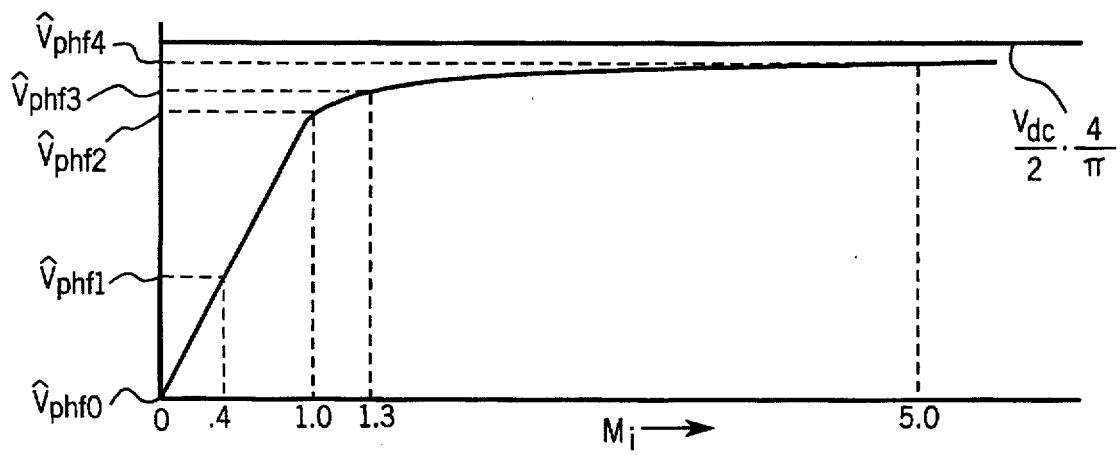
FIG. 2(c) is a graph illustrating the relationship between command voltages and fundamental component phase voltage of a typical prior art PWM.
Figure 3:
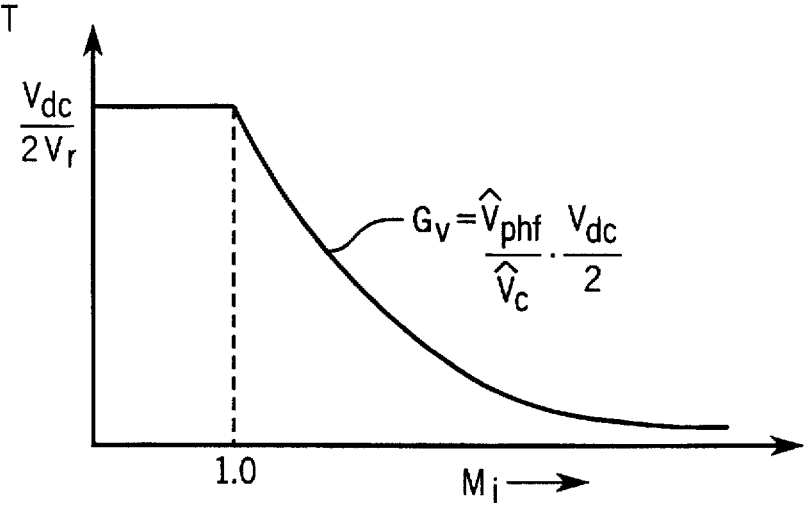
FIG. 3 is a graph illustrating the fundamental component gain of a typical prior art PWM inverter.

The PWM controller 16 includes a carrier wave generator 28 and a comparator module 30. Referring also to FIG. 1(a), the carrier wave generator 28 produces the carrier voltage signal $V_T$ which is provided to the comparator module 30 along line 32. In addition, the comparator module 30 receives three modified command signals $V_{mc}$, $V'_{mc}$, $V''_{mc}$. The comparator module 30 compares each of the modified command signals $V_{mc}$, $V'_{mc}$, $V''_{mc}$ to the carrier signal $V_T$ and produces three firing signals $V_f$, $V'_f$, $V''_f$. In FIGS. 1(a) through 1(c) only a single sinusoidal command signal $V_c$ and signals related thereto are shown in order to simplify this description.

Where the modified command signal $V_c$ is greater than the carrier signal $V_T$, the comparator module 30 produces a corresponding firing signal $V_f$ which is "high." Where a modified command signal $V_{mc}$ is less than the carrier signal $V_T$, the comparator module 30 produces a corresponding firing signal $V_f$ which is "low." Thus, three pulsating firing signals $V_f$, $V'_f$, $V''_f$ are produced that vary in width according to the amplitude of an associated modified command signal. The firing signals $V_f$, $V'_f$, $V''_f$ are provided to the PWM inverter 18 which in turn commands phase voltages $V_h$, $V'_h$, $V''_h$ which result in the corresponding fundamental components $V_{phf}$, $V'_{phf}$, $V''_{phf}$ at the terminals of the motor.

Figure 6:
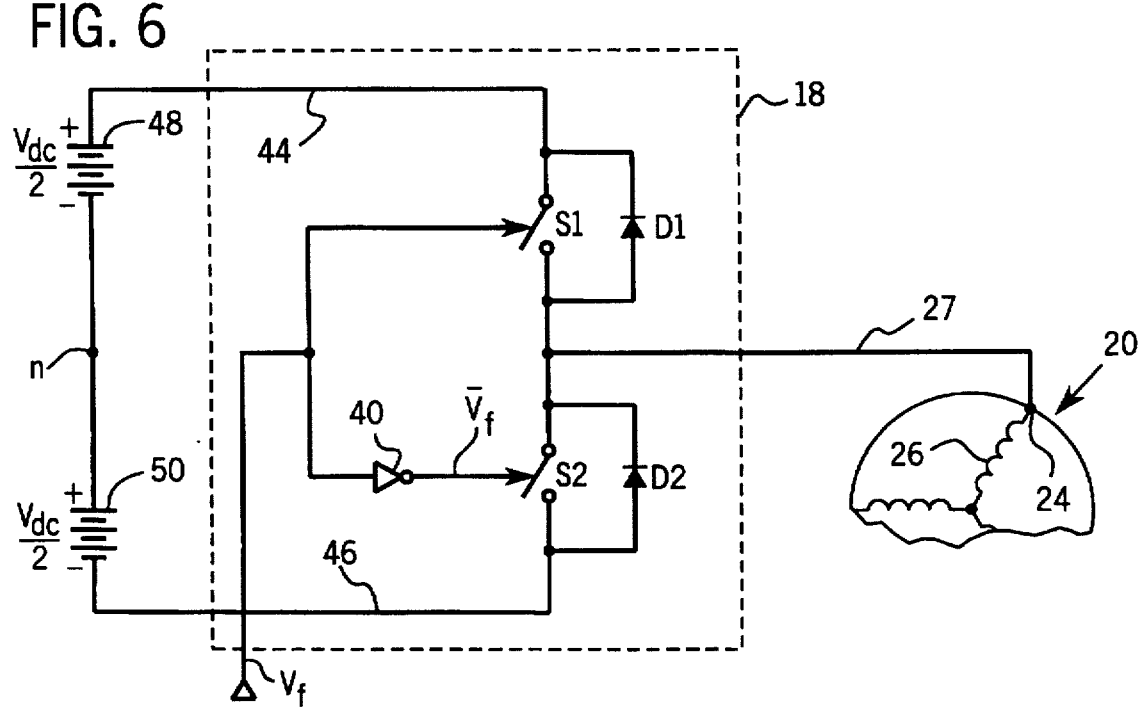
FIG. 6 is a schematic of a single phase of a PWM inverter.

Referring now to FIG. 6, while the inverter and controller described operate to control three separate phases of a three-phase motor, only operation of a single phase will be explained in detail. It should be understood that component corresponding to the two phases which are not described are duplicative in configuration and operation.

For each phase of the three-phases of the motor 20, the inverter 18 includes a pair of switches S1 and S2 (BJT, GTO, IGBT or other transistor technology may be used). Each pair of switches includes an upper switch S1 and a lower switch S2 and each connects to positive or negative DC buses 44, 46, respectively. Each switch S1 and S2 is coupled with an inverse parallel connected diode D1, D2 respectively. Such diodes and their function are well known in the art. A separate one of the three phase winding 26 is electrically connected between the switches S1 and S2.

The firing signal $V_f$ is provided to the upper switch S1. In addition, the firing signal $V_f$ is inverted by inverter 40 producing inverted firing signals $\overline{V}_f$. The inverted firing signal $\overline{V}_f$ is provided to the lower switch S2.

When the inverter switches S1 and S2 are controlled by the firing and inverted firing signals, as an upper switch S1 opens, the corresponding lower switch S2 closes. When an upper switch closes, a corresponding lower switch opens.

A DC voltage source connects the positive and negative DC busses 44, 46. For the purpose of this description, the DC source can be thought of as consisting of two series arranged DC sources 48, 50 respectively, that connect the positive and negative DC buses 44, 46. The positive terminal of the source 48 is connected to the positive DC bus 44 and its negative terminal is connected at a node n to the positive terminal of the DC source 50. The negative terminal of the DC source 50 is connected to the negative DC bus 46. Both DC voltage sources 48, 50 produce potentials of identical magnitude but of opposite signs with respect to central point n on the DC voltage source.

Referring to FIGS. 1(b), 1(c), and 6, when the firing signal $V_f$ is received by the inverter 18, the signal $V_f$ is directed to the first switch S1 whereas the corresponding inverted signal $\overline{V}_f$ is directed to the second switch S2. When firing signal $V_f$ is high and $\overline{V}_f$ is low, the first switch S1 is closed and the second switch S2 is opened. In this state, stator winding 26 is connected through line 27 and the first switch S1 to the positive DC bus 44. This produces a positive DC voltage pulse 31 across stator winding 26. This positive pulse 31 has an amplitude equal to the magnitude of the DC voltage source 48 (i.e. $+V_{dc}/2$) and a width equal to the width of the firing signal $V_f$.

When the signal $V_f$ goes low, the inverted firing signal $\overline{V}_f$ goes high. During this time, firing signal $V_f$ opens the first switch S1 and the inverted firing signal $\overline{V}_f$ closes the second switch S2. This disconnects stator winding 26 from the positive DC bus 44 and shortly thereafter connects the stator winding 26, through line 27 and the second switch S2, to the negative DC bus 46. When so connected, a negative DC pulse 32 is generated across winding 26 having an amplitude equal to the magnitude of the DC voltage source 50 (i.e. $-V_{dc}/2$) and a width equal to inverted firing signal $\overline{V}_f$.

By changing the widths of the positive DC pulses 31 with respect to the widths of the negative DC pulses 32 rapidly over time, a changing fundamental component phase voltage $V_{phf}$ which follows the command voltage $V_c$ can be provided across the stator winding 26. This phase voltage $V_{phf}$ gives rise to a phase current $I_{ph}$ which lags the voltage by a phase angle $\Phi$.

Referring again to FIG. 5, a command voltage modifier 52 provides the modified command voltages $V_{mc}, V'_{mc}, V''_{mc}$ to the comparator module 30. The command voltage modifier 52 receives original command voltages $V_c, V'_c, V''_c$, and, where those original voltages have magnitudes which exceed the peak value of the carrier signal provided by the carrier wave generator 28, the command voltage modifier 52 modifies the original command voltages $V_c, V'_c, V''_c$, thus providing the modified command voltages $V_{mc}, V'_{mc}, V''_{mc}$ in order to maintain the linear relationship between the original sinusoidal command voltages $V_c, V'_c, V''_c$ and the fundamental components of the phase voltages applied to the motor.

Again, to simplify this explanation, while the command voltage modifier 52 includes components which modify each of the initial command voltages $V_c, V'_c, V''_c$, components required to modify only initial command voltage $V_c$ are explained here. It should be understood that identically configured components are provided for each of the three initial command voltages $V_c, V'_c, V''_c$ and each grouping of components operates in the same manner.

Figure 7:
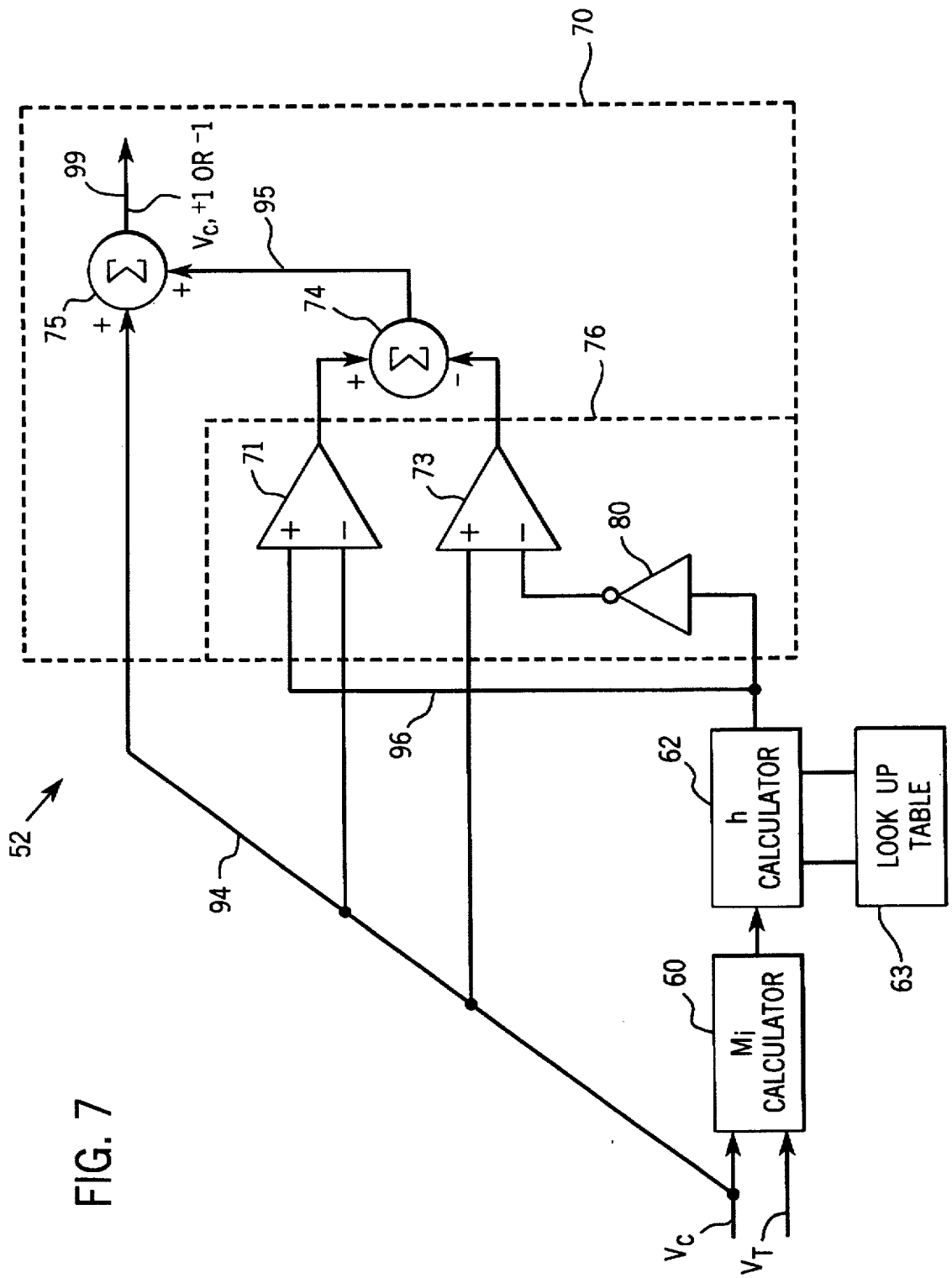
FIG. 7 is a schematic of the command voltage modifier of FIG. 5.

Referring now to FIG. 7, the command voltage modifier 52 includes a modulation index calculator 60, a magnitude h calculator 62, and a signal modifier module 70 including a comparator module 76 and two summers 74, 75. The comparator module 76 includes an inverter 80 and two operational amplifiers 71 and 73. The modulation index calculator 60 receives both the original command voltage $V_c$ and the carrier signal $V_T$ and divides the peak value $\hat{V}_c$ of the original command voltage by the peak value $\hat{V}_T$ of the carrier signal to determine the current modulation index $M_i$.

The modulation index $M_i$ is provided to the magnitude h calculator 62 which determines the magnitude h above which, during a positive half-cycle, the modified command signal $V_{mc}$ should be tied to +1 and below the negative value of which, during a negative half-cycle, the modified command signal $V_{mc}$ should be tied to −1 to maintain the linear relationship between the sinusoidal command voltage $V_c$ and the fundamental component of the phase voltage $V_{phf}$.

Depending on the platform of implementation, the magnitude h calculator 62 will generate the magnitude h by solving Equation 4 or some other suitable equation and provide magnitude h on line 96. In the alternative, for more practical implementation, Equation 4 can be solved off-line and stored in a processor memory as a look-up table 63. In operation, where a look-up table 63 is provided, the circulator 62 would search the look-up table 63 to identify a desired magnitude h given a specific modulation index $M_i$. The modifier module 70 receives the original command signal $V_c$ via line 94 and the magnitude h via line 96.

The magnitude h is inverted by inverter 80 and supplied to the negative input of amplifier 73. Magnitude h is also supplied via line 96 to the positive input of amplifier 71. Line 94 provides the command voltage $V_c$ to the negative input of amplifier 71 and the positive input of amplifier 73. The output of amplifier 73 is subtracted from the output of amplifier 71 by summer 74.

The difference between amplifier outputs generated by summer 74 is provided to summer 75 via line 95 where the difference is added to the original command voltage $V_c$. Summer 75 output is provided on line 99.

In operation, referring still to FIG. 7, the $M_i$ calculator 60 determines the modulation index $M_i$ and provides the modulation index $M_i$ to the magnitude h calculator 62. Referring also to FIG. 4(b), the operational amplifier 71 receives both the magnitude h and the original command voltage $V_c$ and identifies period $\alpha_2$ wherein the command voltage $V_c$ is greater than the magnitude h. Where the command voltage $V_c$ is greater than h, the output of amplifier 71 is positive one. Operation amplifier 73 receives both negative h (via inverter 80) and the original command voltage $V_c$ and identifies period $\alpha_3$ wherein the command voltage $V_c$ is less than negative h. Where the command voltage is less than negative h the amplifier 73 output is positive one.

When amplifier 73 output is subtracted from amplifier 71 output by summer 74, the result on line 95 is a waveform that is positive one during period $\alpha_2$, negative one during $\alpha_3$, and zero at all other times. Thus, when the output of summer 74 is added to the command voltage $V_c$ at summer 75, the result on line 99 is $V_c+1$ during $\alpha_2$, $V_c-1$ during $\alpha_3$, and $V_c$ at all other times.

Figure 4C:
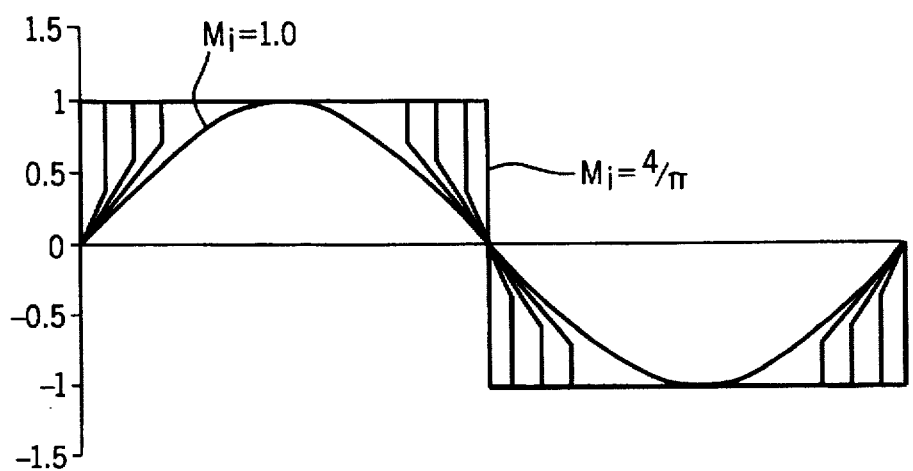
FIG. 4(c) is a graph showing modified command signals from $M_i \approx 1.0$ to $M_i = 4/\pi$.

Then, referring to FIGS. 4(c), 5 and 7, assuming the peak carrier signal value $\hat{V}_T$ is ±1, when the modified command voltage on line 99 is compared to the carrier signal by comparator module 30, the effective part of the modified command voltage is +1, −1 or $V_c$ as desired.

Thus, a simple method and apparatus for extending the linear relationship between a sinusoidal command signal and the resulting fundamental component of phase voltage to cover all possible phase voltage values has been described.

While this description has been by way of example of how the present invention can be carried out, those with experience in the art will recognize that various parts of the preferred embodiment may be modified to provide other embodiments which come within the scope of the invention.

For example, for practical on-line implementation of the present invention, a quadratic/cubic equation could easily be fitted to the solution of Equation 4 shown in FIG. 8. The quadratic/cubic could be used instead of Equation 4 to determine magnitude h.

In addition, while the invention is described above as clamping the command signal $V_c$ to the peak carrier value (i.e. +1 or −1) when the command signal $V_c$ exceeds magnitude h, the invention also covers embodiments where the command signal $V_c$ is clamped to less than the maximum carrier values for modified periods. For example, referring again to FIG. 4(b), where magnitude h is determined, it may be advantageous to clamp to approximately 0.90 times the peak carrier value when the command signal $V_c$ exceeds 0.90h. Hence, a predetermined clamping value other than unity could be used. Furthermore, while the invention is described above in the context of a three-phase motor controller and inverter, it should be understood that the invention could be used with any PWM inverter or converter to change AC to DC or DC to AC voltage. This includes single phase as well as multiphase configurations.

In addition, while the invention is described above in the context of an asynchronous PWM, it could clearly be used with a synchronous PWM where the carrier signal $V_T$ is locked in phase with the command voltage $V_c$. Moreover, the invention could be used with a command voltage $V_c$ that is other than sinusoidal. For example, the command voltage $V_c$ could include a third harmonic or the command voltage $V_c$ could be some form of discontinuing switching command used to limit switching power losses. Command voltages $V_c$ other than sinusoidal voltage are well known to those skilled in the art. Where an other than sinusoidal command voltage is used, the equation for magnitude h (i.e. Equation 4) would have to be modified accordingly. However, the concept would be the same with the result that, referring again to FIG. 4(b), added volt-secs. corresponding to areas $A_2$ and $A_3$ should be equal to lost volt-secs. corresponding to area $A_1$.

Furthermore, while explained as being implemented in hardware, the present invention could clearly be implemented in software run by a microprocessor.

Therefore, to apprise the public of the scope of the invention and the embodiments covered by the invention the following claims are made:

We claim:

1. A method to be used with a PWM inverter which receives a command signal having positive and negative half-cycles and a peak command value and a high frequency carrier signal having a peak carrier value and generates a series of high frequency voltage pulses therefrom, a fundamental component of which, over a period of a sinusoidal command, is a phase voltage, a modulation index being a ratio of the peak command value to the peak carrier value, the phase voltage being variable within a phase voltage range and being substantially linearly related to the sinusoidal command signal when the modulation index is less than unity, the method for extending the linear relationship between the sinusoidal command signal and the phase voltage to include the entire phase voltage range, the method comprising the steps of:

(a) choosing a sub-period;

(b) comparing the modulation index to unity;

(c) when the modulation index exceeds unity, during each positive half-cycle of the command signal, clamping the command signal to a positive predetermined value for a time equal to the sub-period and, during each negative half-cycle of the command signal, clamping the command signal to a negative predetermined value for a time equal to the sub-period to provide a modified command signal; and (d) providing the modified command signal to the inverter for comparison with said carrier signal to generate a phase voltage.

2. The method of claim 1 wherein the step of clamping does not take place until the modulation index exceeds $2/\sqrt{3}$.

3. The method of claim 1 wherein the step of clamping to a positive predetermined value includes the step of clamping to the positive peak carrier value and the step of clamping to a negative predetermined value includes the step of clamping to the negative peak carrier value.

4. The method of claim 3 further including the step of determining a clamp magnitude, the step of clamping including clamping when the absolute value of the command signal is greater than or equal to the clamp magnitude, the sub-period for a half-cycle being the period during which the command signal magnitude is greater than or equal to the clamp magnitude.

5. The method of claim 4 wherein the step of determining includes the step of solving the equation:

$$\frac{4}{\pi} \cos\left[\sin^{-1}\left(\frac{h}{M_i}\right)\right] + \frac{M_i}{\pi}\left[(2)\sin^{-1}\left(\frac{h}{M_i}\right) - \sin\left[(2)\sin^{-1}\left(\frac{h}{M_i}\right)\right]\right] = M_i$$

for h, where Mi is the modulation index and h is the clamp magnitude.

6. The method of claim 3 wherein the inverter includes a look-up table consisting of a plurality of correlated clamp magnitudes and modulation indexes, and the step of determining includes the step of identifying a clamp magnitude in the look-up table which corresponds to a specific modulation index.

7. The method of claim 1 further including the step of, prior to determining, calculating the modulation index.

8. An apparatus to be used with a PWM inverter which receives a sinusoidal command signal having a peak command value and positive and negative half-cycles and a high frequency carrier signal having a peak carrier value and generates a series of high frequency voltage pulses therefrom a fundamental component of which over a period of the sinusoidal command is a phase voltage, a modulation index being the ratio of the peak command value to a peak carrier value, the phase voltage being variable within a phase voltage range and being substantially linearly related to the sinusoidal command signal when the modulation index is less than unity, the apparatus used for extending the linear relationship between the sinusoidal command signal and the phase voltage to include the entire phase voltage range, the apparatus comprising:

a signal modifier that, when the modulation index exceeds unity, during each positive half-cycle of the command signal, clamps the command signal to a positive predetermined value for a sub-period and, during each negative half-cycle of the command signal, clamps the command signal to a negative predetermined value for a sub-period to provide a modified command signal, the modifier providing the modified command signal to the inverter for comparison with said carrier signal to generate a phase voltage;

wherein, the predetermined values are chosen and the sub-periods are such that, when the modified command signal is compared to the carrier signal, the inverter generates a fundamental component phase voltage that substantially maintains a linear relationship with the command signal.

9. The apparatus of claim 8 wherein the signal modifier does not clamp until the modulation index exceeds $2/\sqrt{3}$.

10. The apparatus of claim 8 wherein the positive predetermined value is the positive peak carrier value and the negative predetermined value is the negative peak carrier value.

11. The apparatus of claim 10 further including a calculator for determining a clamp magnitude, the modifier clamping the command signal when the absolute value of the command signal is greater than or equal to the clamp magnitude, the sub-period for a half-cycle being the period during which the command signal absolute value is greater than or equal to the clamp magnitude.

12. The apparatus of claim 11 wherein calculator determines the clamp magnitude by solving the equation:

$$\frac{4}{\pi} \cos\left[\sin^{-1}\left(\frac{h}{M_i}\right)\right] + \frac{M_i}{\pi}\left[(2)\sin^{-1}\left(\frac{h}{M_i}\right) - \sin\left[(2)\sin^{-1}\left(\frac{h}{M_i}\right)\right]\right] = M_i$$

for h, where $M_i$ is the modulation index and h is the clamp magnitude.

13. The apparatus of claim 11 further including a look-up table consisting of a plurality of clamp magnitudes which have been generated off line as a function of different modulation indexes, and the calculator determines the clamp magnitude by looking up the magnitude in the look-up table which corresponds to a specific modulation index.

14. The apparatus of claim 8 further including a modulation index calculator.

15. An apparatus to be used with a PWM inverter which receives a sinusoidal command signal having a peak command value and positive and negative half-cycles and a high frequency carrier signal having a peak carrier value and generates a series of high frequency voltage pulses therefrom a fundamental component of which over a period of the command signal is a phase voltage, a modulation index being a ratio of the peak command value to a peak carrier value, the phase voltage being variable within a phase voltage range and being substantially linearly related to the sinusoidal command signal when the modulation index is less than unity, the apparatus used for extending the linear relationship between the sinusoidal command signal and the phase voltage to include the entire phase voltage range, the apparatus comprising:

(i) a clamp calculator for, if the modulation index exceeds unity, determining a clamp magnitude; and (ii) a signal modifier that, if the modulation index exceeds unity, during each positive half-cycle of the command signal, clamps the command signal to a positive peak carrier value when the command signal absolute value is greater than or equal to the clamp magnitude and, during each negative half-cycle of the command signal, clamps the command signal to a negative peak carrier value when the command signal absolute value is greater than or equal to the clamp magnitude, to provide a modified command signal, the modifier providing the modified command signal to the inverter for comparison with said carrier signal to generate a phase voltage;

wherein, the calculator determines the clamp magnitude such that, when the modified command signal is compared to the carrier signal, the inverter generates a fundamental component phase voltage that substantially maintains a linear relationship with the command signal.

16. The apparatus of claim 15 wherein calculator determines the clamp magnitude by solving the equation:

$$\frac{4}{\pi} \cos\left[\sin^{-1}\left(\frac{h}{M_i}\right)\right] + \frac{M_i}{\pi}\left[(2)\sin^{-1}\left(\frac{h}{M_i}\right) - \sin\left[(2)\sin^{-1}\left(\frac{h}{M_i}\right)\right]\right] = M_i$$

for h, where $M_i$ is the modulation index and h is the clamp magnitude.

17. The apparatus of claim 15 wherein the clamp calculator does not determine until the modulation index exceeds $2/\sqrt{3}$.

* * * * *